United States Patent
Birmingham (10) Patent No.: US 7,924,934 B2
(45) Date of Patent: Apr. 12, 2011

(54) TIME DIVERSITY VOICE CHANNEL DATA COMMUNICATIONS

(75) Inventor: Kiley Birmingham, Seattle, WA (US)

(73) Assignee: Airbiquity, Inc., Seattle, WA (US)

( * ) Notice: Subject to any disclaimer, the term of this patent is extended or adjusted under 35 U.S.C. 154(b) by 249 days.

(21) Appl. No.: 11/442,705

(22) Filed: May 26, 2006

(65) Prior Publication Data

US 2007/0264964 A1 Nov. 15, 2007

Related U.S. Application Data (60) Provisional application No. 60/790,225, filed on Apr. 7, 2006.

(51) Int. Cl.
*H04L 27/00* (2006.01)
*H04L 27/06* (2006.01)
*H03M 13/03* (2006.01)
*H03M 13/00* (2006.01)

(52) U.S. Cl. ........ 375/265; 714/786; 714/799; 375/324; 375/340

(58) Field of Classification Search ............. 375/240.26–240.27, 262–265, 375/340–342, 324–325; 714/751, 786, 791, 714/792, 794, 795, 799, 758, 6
See application file for complete search history.

(56) References Cited

U.S. PATENT DOCUMENTS

| | | | |
|---|---|---|---|
| 3,742,197 A | 6/1973 | Pommerening | |
| 3,971,888 A | 7/1976 | Ching | |
| 4,158,748 A | 6/1979 | En | |
| 4,218,654 A | 8/1980 | Ogawa | |
| 4,310,722 A | 1/1982 | Schaible | |
| 4,355,310 A | 10/1982 | Belaigues | |
| 4,368,987 A | 1/1983 | Waters | |
| 4,494,114 A | 1/1985 | Kaish | |
| 4,494,211 A | 1/1985 | Schwartz | |
| 4,539,557 A | 9/1985 | Redshaw | |
| 4,577,343 A | 3/1986 | Oura | |
| 4,598,272 A | 7/1986 | Cox | |
| 4,599,583 A | 7/1986 | Shimozono | |
| 4,607,257 A | 8/1986 | Noguchi | |
| 4,641,323 A | 2/1987 | Tsang | |
| 4,651,157 A | 3/1987 | Gray | |

(Continued)

FOREIGN PATENT DOCUMENTS

CA 2242495 1/2000

(Continued)

OTHER PUBLICATIONS

European Search Report of EP 06 25 3546 dated Jun. 30, 2008.

(Continued)

*Primary Examiner* — David C. Payne
*Assistant Examiner* — Linda Wong
(74) *Attorney, Agent, or Firm* — Stolowitz Ford Cowger LLP (57) ABSTRACT

A receiver with a time diversity combining component recovers a digital data signal transmitted over a voice channel of a digital wireless telecommunications network. A feature extraction module receives an audio frequency waveform encoding the digital data signal and generates a feature vector representing the digital data signal. A bit sequence estimation module analyzes the feature vector and generates an estimated bit sequence corresponding to the digital data signal. A memory stores the feature vector if the estimated bit sequence contains errors. A time diversity combining component generates a second estimated bit sequence by analyzing the first feature vector in combination with one or more feature vectors stored in the memory.

26 Claims, 5 Drawing Sheets

U.S. PATENT DOCUMENTS

| | | |
|---|---|---|
| 4,656,463 A | 4/1987 | Anders |
| 4,675,656 A | 6/1987 | Narcisse |
| 4,750,197 A | 6/1988 | Denekamp |
| 4,754,255 A | 6/1988 | Sanders |
| 4,766,589 A | 8/1988 | Fisher |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang |
| 4,984,238 A | 1/1991 | Watanabe |
| 5,014,344 A | 5/1991 | Goldberg |
| 5,025,455 A | 6/1991 | Nguyen |
| 5,040,214 A | 8/1991 | Grossberg |
| 5,043,736 A | 8/1991 | Darnell |
| 5,081,667 A | 1/1992 | Drori |
| 5,095,307 A | 3/1992 | Shimura et al. |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,201,071 A | 4/1993 | Webb |
| 5,203,012 A | 4/1993 | Patsiokas |
| 5,212,831 A | 5/1993 | Chuang |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van den Heuvel |
| 5,305,384 A | 4/1994 | Ashby |
| 5,317,309 A | 5/1994 | Vercellotti |
| 5,331,635 A | 7/1994 | Ota |
| 5,333,175 A | 7/1994 | Ariyavisitakul |
| 5,334,974 A | 8/1994 | Simms |
| 5,347,272 A | 9/1994 | Ota |
| 5,363,375 A | 11/1994 | Chuang |
| 5,363,376 A | 11/1994 | Chuang |
| 5,365,450 A | 11/1994 | Schuchman |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A | 6/1995 | Sprague |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,459,469 A | 10/1995 | Schuchman |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| 5,509,035 A | 4/1996 | Teidemann, Jr. |
| 5,510,797 A | 4/1996 | Abraham |
| 5,513,111 A | 4/1996 | Wortham |
| 5,515,043 A | 5/1996 | Berard |
| 5,519,403 A | 5/1996 | Bickley |
| 5,519,621 A | 5/1996 | Wortham |
| 5,528,232 A | 6/1996 | Verma |
| 5,530,701 A | 6/1996 | Stillman |
| 5,537,458 A | 7/1996 | Suomi |
| 5,539,810 A | 7/1996 | Kennedy, III |
| 5,543,789 A | 8/1996 | Behr |
| 5,544,222 A | 8/1996 | Robinson |
| 5,544,225 A | 8/1996 | Kennedy, III |
| 5,546,445 A | 8/1996 | Dennison |
| 5,550,551 A | 8/1996 | Alesio |
| 5,551,066 A | 8/1996 | Stillman |
| 5,555,286 A | 9/1996 | Tendler |
| 5,555,520 A | 9/1996 | Sudo |
| 5,557,254 A | 9/1996 | Johnson |
| 5,565,858 A | 10/1996 | Guthrie |
| 5,566,173 A | 10/1996 | Steinbrecher |
| 5,572,204 A | 11/1996 | Timm |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner |
| RE35,498 E | 4/1997 | Barnard |
| 5,619,684 A | 4/1997 | Goodwin |
| 5,621,388 A | 4/1997 | Sherburne |
| 5,625,668 A | 4/1997 | Loomis et al. |
| 5,627,517 A | 5/1997 | Theimer et al. |
| 5,630,206 A | 5/1997 | Urban et al. |
| 5,640,444 A | 6/1997 | O'Sullivan |
| 5,650,770 A | 7/1997 | Schlager |
| 5,663,734 A | 9/1997 | Krasner |
| 5,666,357 A | 9/1997 | Jangi |
| 5,668,803 A | 9/1997 | Tymes |
| 5,673,305 A | 9/1997 | Ross |
| 5,680,439 A | 10/1997 | Aguilera |
| 5,686,910 A | 11/1997 | Timm |
| 5,687,215 A | 11/1997 | Timm |
| 5,687,216 A | 11/1997 | Svensson |
| 5,691,980 A | 11/1997 | Welles |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace, II |
| 5,724,243 A | 3/1998 | Westerlage |
| 5,726,893 A | 3/1998 | Schuchman |
| 5,726,984 A | 3/1998 | Kubler |
| 5,731,757 A | 3/1998 | Layson |
| 5,732,326 A | 3/1998 | Maruyama |
| 5,734,981 A | 3/1998 | Kennedy |
| 5,742,233 A | 4/1998 | Hoffman |
| 5,748,083 A | 5/1998 | Reitkerk |
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| D395,250 S | 6/1998 | Kabler |
| 5,761,204 A | 6/1998 | Grob et al. |
| 5,761,292 A | 6/1998 | Wagner |
| 5,771,001 A | 6/1998 | Cobb |
| 5,771,455 A | 6/1998 | Kennedy, III |
| 5,774,876 A | 6/1998 | Woolley |
| 5,781,156 A | 7/1998 | Krasner |
| 5,784,422 A | 7/1998 | Heermann |
| 5,786,789 A | 7/1998 | Janky |
| 5,794,124 A * | 8/1998 | Ito et al. ........................ 340/7.44 |
| 5,796,808 A | 8/1998 | Scott |
| 5,797,091 A | 8/1998 | Clise |
| 5,804,810 A | 9/1998 | Wolley |
| 5,805,576 A | 9/1998 | Worley, III |
| 5,812,087 A | 9/1998 | Krasner |
| 5,812,522 A | 9/1998 | Lee |
| 5,815,114 A | 9/1998 | Speasl |
| RE35,916 E | 10/1998 | Dennison |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |

| | | | | | | |
|---|---|---|---|---|---|---|
| 5,838,237 A | 11/1998 | Revell | | 6,195,736 B1 | 2/2001 | Lisle |
| 5,841,396 A | 11/1998 | Krasner | | 6,208,959 B1 | 3/2001 | Jonsson |
| 5,842,141 A | 11/1998 | Vaihoja | | 6,212,207 B1 | 4/2001 | Nicholas |
| 5,850,392 A | 12/1998 | Wang | | 6,226,529 B1 | 5/2001 | Bruno |
| 5,856,986 A | 1/1999 | Sobey | | 6,236,652 B1 | 5/2001 | Preston |
| 5,864,763 A | 1/1999 | Leung | | 6,249,227 B1 | 6/2001 | Brady |
| 5,870,675 A | 2/1999 | Tuutijarvi | | 6,266,008 B1 | 7/2001 | Huston |
| 5,874,914 A | 2/1999 | Krasner | | 6,269,392 B1 | 7/2001 | Cotichini |
| 5,881,069 A | 3/1999 | Cannon et al. | | 6,272,315 B1 | 8/2001 | Chang |
| 5,881,373 A | 3/1999 | Elofsson | | 6,275,990 B1 | 8/2001 | Dapper |
| 5,884,214 A | 3/1999 | Krasner | | 6,282,430 B1 | 8/2001 | Young |
| 5,886,634 A | 3/1999 | Muhme | | 6,288,645 B1 | 9/2001 | McCall |
| 5,892,441 A | 4/1999 | Woolley | | 6,295,461 B1 | 9/2001 | Palmer |
| 5,892,454 A | 4/1999 | Schipper | | 6,300,863 B1 | 10/2001 | Cotichini |
| 5,901,179 A | 5/1999 | Urabe | | 6,300,875 B1 | 10/2001 | Schafer |
| 5,912,886 A | 6/1999 | Takahashi | | 6,301,480 B1 | 10/2001 | Kennedy |
| 5,912,902 A * | 6/1999 | Monroe ................. 714/746 | | 6,304,186 B1 | 10/2001 | Rabanne |
| 5,913,170 A | 6/1999 | Wortham | | 6,304,637 B1 | 10/2001 | Mirashrafi |
| 5,917,449 A | 6/1999 | Sanderford | | 6,307,471 B1 | 10/2001 | Xydis |
| 5,918,180 A | 6/1999 | Dimino | | 6,308,060 B2 | 10/2001 | Wortham |
| 5,930,340 A | 7/1999 | Bell | | 6,320,535 B1 | 11/2001 | Hillman |
| 5,930,722 A | 7/1999 | Han | | 6,327,533 B1 | 12/2001 | Chou |
| 5,933,468 A | 8/1999 | Kingdon | | 6,343,217 B1 | 1/2002 | Borland |
| 5,936,526 A | 8/1999 | Klein | | 6,345,251 B1 | 2/2002 | Jansson |
| 5,937,355 A | 8/1999 | Joong | | 6,351,495 B1 | 2/2002 | Tarraf |
| 5,940,598 A | 8/1999 | Strauss | | 6,359,923 B1 * | 3/2002 | Agee et al. .................. 375/130 |
| 5,945,944 A | 8/1999 | Krasner | | 6,362,736 B1 | 3/2002 | Gehlot |
| 5,946,304 A | 8/1999 | Chapman | | 6,373,842 B1 * | 4/2002 | Coverdale et al. ............ 370/394 |
| 5,946,611 A | 8/1999 | Dennison | | 6,405,033 B1 | 6/2002 | Kennedy, III |
| 5,949,335 A | 9/1999 | Maynard | | 6,434,198 B1 | 8/2002 | Tarraf |
| 5,953,694 A | 9/1999 | Pillekamp | | 6,466,582 B2 | 10/2002 | Preston |
| 5,960,363 A | 9/1999 | Mizikovcky | | 6,470,046 B1 | 10/2002 | Scott |
| 5,961,608 A | 10/1999 | Onosaka et al. | | 6,477,633 B1 | 11/2002 | Grimmett |
| 5,963,130 A | 10/1999 | Schlager | | 6,493,338 B1 | 12/2002 | Preston |
| 5,963,134 A | 10/1999 | Bowers | | 6,516,198 B1 | 2/2003 | Tendler |
| 5,970,130 A | 10/1999 | Katko | | 6,519,260 B1 | 2/2003 | Galyas |
| 5,978,676 A | 11/1999 | Guridi | | 6,522,265 B1 | 2/2003 | Hillman |
| 5,991,279 A | 11/1999 | Haugli | | 6,526,026 B1 | 2/2003 | Menon |
| 5,999,124 A | 12/1999 | Sheynblat | | 6,529,744 B1 | 3/2003 | Birkler |
| 5,999,126 A | 12/1999 | Ito | | 6,611,804 B1 | 8/2003 | Dorbecker |
| 6,002,363 A | 12/1999 | Krasner | | 6,614,349 B1 | 9/2003 | Proctor |
| 6,009,325 A | 12/1999 | Retzer | | 6,617,979 B2 | 9/2003 | Yoshioka |
| 6,009,338 A | 12/1999 | Iwata | | 6,628,967 B1 | 9/2003 | Yue |
| 6,011,973 A | 1/2000 | Valentine | | 6,665,333 B2 | 12/2003 | McCrady |
| 6,014,089 A | 1/2000 | Tracy | | 6,681,121 B1 | 1/2004 | Preston |
| 6,014,090 A | 1/2000 | Rosen | | 6,683,855 B1 * | 1/2004 | Bordogna et al. ............. 370/244 |
| 6,014,376 A | 1/2000 | Abreu | | 6,690,681 B1 | 2/2004 | Preston et al. |
| 6,021,163 A | 2/2000 | Hoshi | | 6,690,922 B1 | 2/2004 | Lindemann |
| 6,024,142 A | 2/2000 | Bates | | 6,700,867 B2 * | 3/2004 | Classon et al. ................ 370/216 |
| 6,031,489 A | 2/2000 | Wyrwas | | 6,747,571 B2 | 6/2004 | Fierro |
| 6,032,037 A | 2/2000 | Jeffers | | 6,754,265 B1 | 6/2004 | Lindemann |
| 6,038,310 A | 3/2000 | Hollywood | | 6,771,629 B1 | 8/2004 | Preston |
| 6,038,595 A | 3/2000 | Ortony | | 6,778,645 B1 | 8/2004 | Rao |
| 6,041,124 A | 3/2000 | Sugita | | 6,836,515 B1 | 12/2004 | Kay |
| 6,044,257 A | 3/2000 | Boling | | 6,845,153 B2 | 1/2005 | Tiburtius |
| 6,049,971 A | 4/2000 | Ben-Yehezhel | | 6,917,449 B2 | 7/2005 | Nakajima |
| 6,055,434 A | 4/2000 | Seraj | | 6,940,809 B2 * | 9/2005 | Sun et al. ..................... 370/216 |
| 6,057,756 A | 5/2000 | Engellenner | | 6,981,022 B2 | 12/2005 | Boundy |
| 6,067,044 A | 5/2000 | Whelan | | 6,993,362 B1 | 1/2006 | Aberg |
| 6,067,457 A | 5/2000 | Erickson | | 7,103,550 B2 | 9/2006 | Gallagher |
| 6,069,570 A | 5/2000 | Herring | | 7,151,768 B2 | 12/2006 | Preston |
| 6,070,089 A | 5/2000 | Brophy | | 7,164,662 B2 | 1/2007 | Preston |
| 6,075,458 A | 6/2000 | Ladner | | 7,206,305 B2 | 4/2007 | Preston |
| 6,076,099 A | 6/2000 | Chen | | 7,206,574 B2 | 4/2007 | Bright |
| 6,091,969 A | 7/2000 | Brophy | | 7,215,965 B2 | 5/2007 | Fournier |
| 6,097,760 A | 8/2000 | Spicer | | 7,221,669 B2 | 5/2007 | Preston |
| 6,101,395 A | 8/2000 | Keshavachar | | 7,269,188 B2 | 9/2007 | Smith |
| 6,122,271 A | 9/2000 | McDonald | | 7,317,696 B2 | 1/2008 | Preston |
| 6,122,514 A | 9/2000 | Spaur | | 7,398,100 B2 * | 7/2008 | Harris et al. .................. 455/522 |
| 6,131,067 A | 10/2000 | Girerd | | 7,477,906 B2 | 1/2009 | Radic |
| 6,140,956 A | 10/2000 | Hillman | | 7,483,418 B2 | 1/2009 | Maurer |
| 6,144,336 A | 11/2000 | Preston | | 7,511,611 B2 | 3/2009 | Sabino |
| 6,151,493 A | 11/2000 | Sasakura | | 7,512,098 B2 | 3/2009 | Jiang |
| 6,154,658 A | 11/2000 | Caci | | 2002/0053058 A1 * | 5/2002 | Lee et al. ..................... 714/748 |
| 6,166,688 A | 12/2000 | Cromer | | 2002/0111167 A1 | 8/2002 | Nguyen |
| 6,169,497 B1 | 1/2001 | Robert | | 2002/0122401 A1 | 9/2002 | Xiang |
| 6,173,194 B1 | 1/2001 | Vanttila | | 2003/0016639 A1 | 1/2003 | Kransmo |
| 6,175,307 B1 | 1/2001 | Peterson | | 2003/0147401 A1 | 8/2003 | Kyronaho |
| 6,181,253 B1 | 1/2001 | Eschenbach | | 2004/0034529 A1 | 2/2004 | Hooper, III |

| | | | |
|---|---|---|---|
| 2004/0171370 | A1 | 9/2004 | Natarajan |
| 2005/0090225 | A1 | 4/2005 | Muehleisen |
| 2005/0111563 | A1* | 5/2005 | Tseng .................. 375/261 |
| 2005/0147057 | A1 | 7/2005 | LaDue |
| 2005/0215228 | A1 | 9/2005 | Fostick |
| 2005/0226202 | A1 | 10/2005 | Zhang |
| 2006/0246910 | A1 | 11/2006 | Petermann |
| 2007/0087756 | A1 | 4/2007 | Hoffberg |
| 2007/0124625 | A1* | 5/2007 | Hassan et al. ............ 714/704 |
| 2008/0132200 | A1 | 6/2008 | Shinoda |
| 2008/0143497 | A1 | 6/2008 | Wasson |

FOREIGN PATENT DOCUMENTS

| | | |
|---|---|---|
| DE | 44 24 412 A1 | 1/1996 |
| EP | 0 242 099 A2 | 10/1987 |
| EP | 0 528 090 A1 | 8/1991 |
| EP | 0512 789 A2 | 5/1992 |
| EP | 0 501 058 A2 | 9/1992 |
| EP | 0545783 | 11/1992 |
| EP | 0545783 | 6/1993 |
| EP | 0545783 | 9/1993 |
| EP | 0 580 397 A2 | 1/1994 |
| EP | 0889610 A2 | 1/1999 |
| EP | 0 896 442 A1 | 2/1999 |
| EP | 01 950 402 | 12/2004 |
| GB | 2 290 005 A | 5/1994 |
| JP | 03232349 | 10/1991 |
| JP | 5130008 | 5/1993 |
| JP | 5252099 | 9/1993 |
| JP | 6077887 | 3/1994 |
| JP | 111096062 | 4/1999 |
| WO | WO 9107044 | 5/1991 |
| WO | WO 9521511 | 8/1995 |
| WO | WO 9607110 | 3/1996 |
| WO | WO 9615636 | 5/1996 |
| WO | WO 9618275 | 6/1996 |
| WO | WO98/12835 | 3/1998 |
| WO | WO 9834164 | 8/1998 |
| WO | WO 9834359 | 8/1998 |
| WO | WO 9853573 | 11/1998 |
| WO | WO 9859256 | 12/1998 |
| WO | WO 9859257 | 12/1998 |
| WO | 99/14885 | 3/1999 |
| WO | 9956144 | 4/1999 |
| WO | WO 9956143 | 4/1999 |
| WO | WO 9936795 | 7/1999 |
| WO | WO 9949677 | 9/1999 |
| WO | WO 0011893 | 3/2000 |
| WO | WO 0178249 A1 | 10/2001 |
| WO | WO 0199295 A2 | 12/2001 |
| WO | 02054964 | 7/2002 |
| WO | WO 02054694 A1 | 7/2002 |
| WO | 03034235 | 4/2003 |

OTHER PUBLICATIONS

International Search Report and Written Opinion of International Application No. PCT/US07/64443, dated Sep. 15, 2008.
FCC E911 Order, dated Nov. 23, 1998.
Feher, "MODEMS for Emerging Digital Cellular-Mobile Radio System," IEEE Trans. On Vehicular Technology, vol. 40, No. 2, May 1991, pp. 355-365.
Jain et al, Potential Networking Applications of Global Positioning Systems (GPS), downloadable at http://www.cis.ohio-state-edu/~jain/papers/gps.htm, pp. 1-40, Apr. 1996.
Universal Mobile Telecommunications System (UMTS); Push Architecture (3GPP TR 23.976 version 6.1.0 Release 6); Jun. 2004; 36 pages.
"Tracking," published on the Internet at http://www.wisetrack.com/tracking.html, posted May 29, 2002, Copyright 2001 by TVL, Inc.
Office Action in U.S. Appl. No. 09/625,159 dated Apr. 9, 2003; 15 pages.
Office Action in U.S. Appl. No. 09/677,486 dated Oct. 16, 2001; 9 pages.
3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.

Proviosional U.S. Appl. No. 60/047,034; dated May 19, 1997; Applicant: Preston.
Provisional U.S. Appl. No. 60/047,140; dated May 20, 1997; Applicant: Preston.
Provisional U.S. Appl. No. 60/048,369; dated Jun. 3, 1997; Applicant: Preston.
Provisional U.S. Appl. No. 60/048,385; dated Jun. 3, 1997; Applicant: Preston.
Provisional U.S. Appl. No. 60/055,497; dated Aug. 13, 1997; Applicant: Preston.
Bilbao, Alfonso, m-Security (Security and Mobile Telephony), Proceedings of the IEEE 35th Annual 2001, International Carnahan Conference on Security Technology, Oct. 16-19, 2001.
Brian W. Martin, "WatchIt: A Fully Supervised Identification, Location and Tracking System," Proceedings of the IEEE, 29th Annual 1995 International Carnahan Conference on Security Technology, Oct. 1995.
Brown, et al., "A Reconfigurable Modem for Increased Network . . . " IEEE Trans. On Circuits & Systems for Video Technology, vol. 6, No. 2, Apr. 1996, pp. 215-224.
Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.
Coleman et al., Subjective Performance Evaluation of the RPE-LTP Codec for the Pan-European Cellular Digital Radio Sys. Nov. 27-30, 1989, pp. 758-761; 1075-1079, IEEE.
Digital Cellular Telecommunications System (Phase 2+); GSM 06.31 version 8.0.1 Release 1999. ETSI EN 300 964 V8.01 (Nov. 2001), pp. 1-13. European Standard (Telecommunications serier). (http://www.etsi.org).
3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.
Janus Technologies, Inc., "ProxTrax Asset Tracking Interface," http://www.janus-tech.com/Products/ProxTrax.html, published Mar. 8, 2000.
Lavigne, R.E. and P. Eng, "Trunking Versus Conventional Radio System," Proceedings of the IEEE, 34th Annual 2000 International Carnahan Conference on Security Technology, Oct. 23-25, 2000.
Lin, D., et al., "Data Compression of voiceband Modem Signals," 40th IEEE Vehicular Technology Conference: On the Move in the 90's. May 6-9, 1990, pp. 323-325, IEEE, New York, New York.
Lockwood Technology Corporation, "Asset Management," copyright 2002 by Lockwood Technology Corporation, published on the Internet at http://www.lockwoodtechnology.com/ asset_tracking. html, printed May 29, 2002.
McNichols, Shawn, "Keeping Your Assets Safe," published on the Internet at http://www.securitymagazine.com,CDA/ ArticleInformation/features/BNP_Features, posted Feb. 14, 2002, Copyright 2001-2002 by Business News Publishing Co.
Mueller, A.J. et al. "A DSP Implemented dual 9600/7200 BPS TCM Modem for Mobile Communications Over FM Voice Radios," Proceedings of the 1997 6th IEEE Pacific rim Conference on Communications, Signal Processing, vol. 2, Aug. 20-22, 1997, pp. 758-761, IEEE, New York, New York.
Phifer, Lisa A., Surfing the Web Over Wireless, Jan. 1998, http://www.corecom.com/html/ wireless.html, printed May 22, 2007.
Protean Research Group, "Anycast Routing for Mobile Services (ARMS) Project Overview," Published on the Internet at <http://tang.itd.nrl.navy.mll/5522/anycast/anycast_index.html>, Jan. 19, 2005.
Reut, Anton B., "Remote Monitoring of Military Assets Using Commercial Leo Satellites," IEEE Universal Communications Conference Record, Nov. 6-8, 1995, Copyright 1995 IEEE.
USPTO Search Authority; PCT/US08/80555 International Search Report; Dec. 19, 2008, 11 pages.
Vaha-Sipila, A., URLs for Telephone Calls, Request for Comments: 2806, Network Working Group, Apr. 2000, 16 pages.
Vocal Technologies, Ltd. Home p., "Audio Codecs," http://www.vocal.com/data_sheets/audio_codecs.html?glad, accessed Jun. 12, 2005.
Werb, Jay and Colin Lanzl, "Designing a Positioning System for Finding Things and People Indoors," IEEE Spectrum, Sep. 1998.
Werb, Jay and Colin Lanzl, "The Next Generation of Control: Local Positioning," abstract, Feb. 1999, vol. 26.

* cited by examiner

TIME DIVERSITY VOICE CHANNEL DATA COMMUNICATIONS

RELATED APPLICATION

This application claims priority to U.S. Provisional Patent Application No. 60/790,225, entitled "Time Diversity Voice Channel Data Communications" and filed on Apr. 7, 2006, the disclosure of which is incorporated herein by reference in its entirety.

TECHNICAL FIELD

This application is related to wireless telecommunications and more specifically to time diversity combining of digital data transmitted over the digital voice channel of a wireless telecommunications network.

BACKGROUND

Many telecommunication components used in cellular and landline telephone networks are designed to efficiently transmit voice signals over voice communication channels. For example, a digital voice coder (vocoder) uses linear predictive coding techniques to represent voice signals. These linear predictive coders filter out noise (non-voice signals) while compressing and estimating the frequency components of the voice signals before being transmitted over the voice channel.

It is sometimes desirable to transmit both audio signals and digital data over a wireless telecommunications network. For example, when a cellular telephone user calls "911" for emergency assistance, the user may wish to send digital location data to a call center over the same channel used to verbally explain the emergency conditions to a human operator. However, it can be difficult to transmit digital data signals over the voice channel of a wireless network because such signals are subject to several types of distortion.

For example, a digital data signal traveling over the voice channel of a wireless network can be distorted by vocoder effects caused by the voice compression algorithm. In addition, digital data signals can be distorted by network effects caused by poor RF conditions and/or heavy network traffic. These distortions introduce bit errors that can be overcome using techniques such as forward error correction (FEC) and repeated transmission of bit sequences.

Because there are many kinds of vocoders (e.g., EVRC, AMR, etc.) and many possible network conditions, it is difficult to predict the quality of the voice channel and the associated bit error rate in advance. In addition, the quality of a voice channel can vary rapidly over time. Therefore, it is difficult to design an efficient FEC scheme that minimizes the number overhead bits required for error correction, while at the same time providing acceptable transmission performance in a low-quality channel environment. For example, an FEC scheme with very few overhead bits for error correction may provide acceptable performance over a high-quality channel with few errors to correct, but if the channel quality degrades, the number of bit errors may increase to a level requiring many redundant retransmissions before a particular information sequence is successfully delivered without errors.

SUMMARY

The above-mentioned drawbacks associated with existing systems are addressed by embodiments of the present application, which will be understood by reading and studying the following specification.

A receiver with a time diversity combining component recovers a digital data signal transmitted over a voice channel of a digital wireless telecommunications network. A feature extraction module receives an audio frequency waveform encoding the digital data signal and generates a feature vector representing the digital data signal. A bit sequence estimation module analyzes the feature vector and generates an estimated bit sequence corresponding to the digital data signal. A memory stores the feature vector if the estimated bit sequence contains errors. A time diversity combining component generates a second estimated bit sequence by analyzing the first feature vector in combination with one or more feature vectors stored in the memory.

The foregoing and other features and advantages of the invention will become more readily apparent from the following detailed description of preferred embodiments of the invention, which proceeds with reference to the accompanying drawings.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
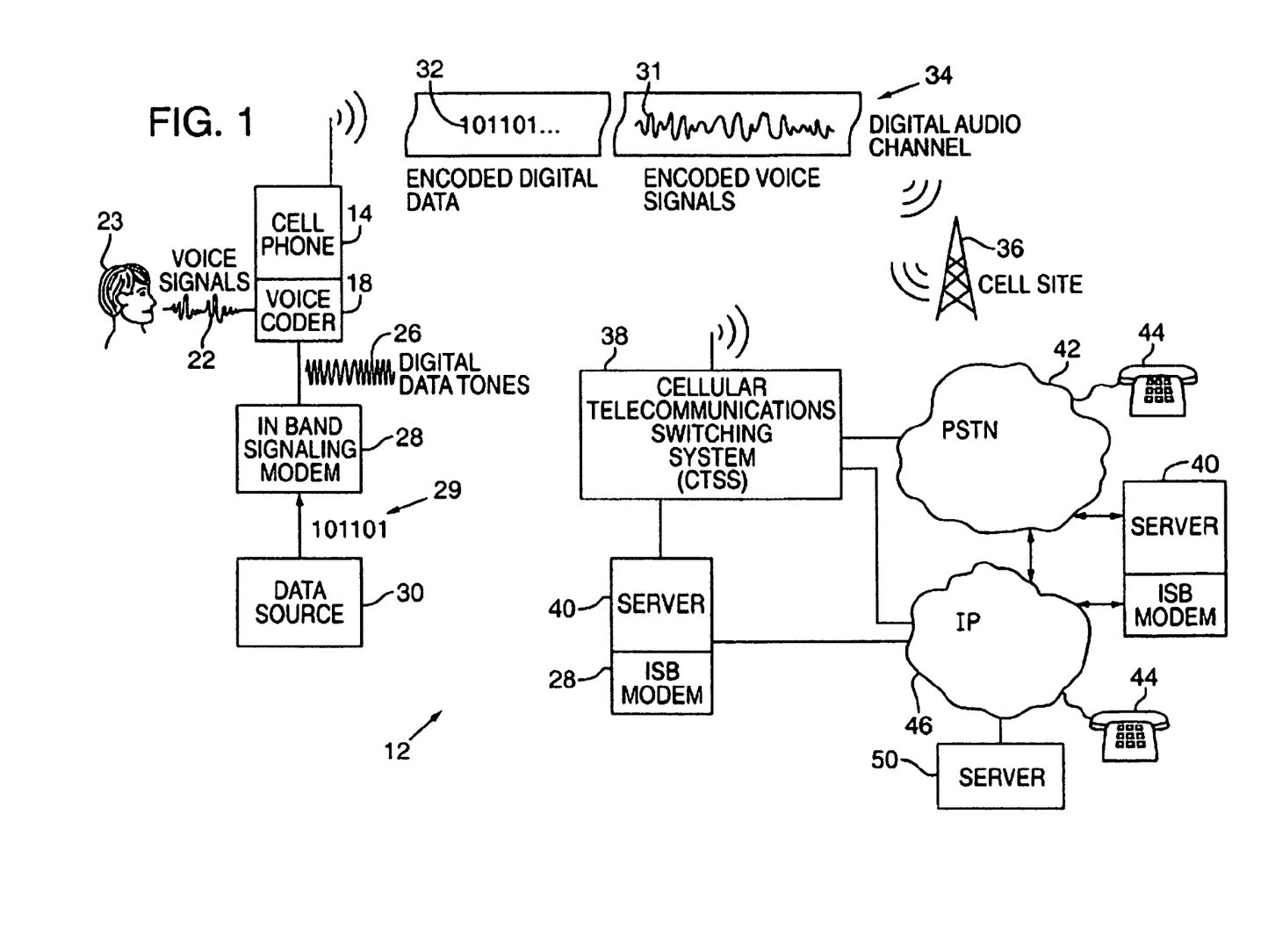
FIG. 1 is a diagram showing a wireless communications network that provides in-band signaling (IBS).

Referring to FIG. 1, a wireless communications network 12 includes a cell phone 14 that receives voice signals 22 from a user 23. A voice coder (vocoder) 18 in the cell phone 14 encodes the voice signals 22 into encoded digital voice signals 31 that are then transmitted over a wireless digital voice channel 34 (cell call). The cell phone 14 transmits the encoded voice signals 31 to a cellular communications site (cell site) 36 that relays the cell call to a Cellular Telecommunications Switching System (CTSS) 38.

The CTSS 38 either connects the cell call to another cell phone either in the wireless cellular network 12, to a landline phone on a PSTN network 42 as a circuit switched call or routes the cell call over a packet switched Internet Protocol (IP) network 46 as a Voice Over IP (VOIP) call. The cell call can also be routed from the PSTN network 42 back to the cellular network 12 or from the PSTN network 42 to the IP network 46, or vice versa. The cell call eventually reaches a telephone 44 that corresponds with a destination phone number originally entered at the cell phone 14.

An In-Band Signaling (IBS) modem 28 enables cell phone 14 to transmit digital data 29 from a data source 30 over the digital voice channel 34 of the cellular network 12. The IBS modem 28 modulates the digital data 29 into synthesized digital data tones 26. As used herein, the term "digital data tones" refers to audio tones that are modulated to encode digital data bits. The digital data tones 26 prevent the encoding components in the cellular network 12, such as vocoder 18, from excessively corrupting the digital data. The encoding and modulation scheme used in the IBS modem 28 allows digital data 29 to be transmitted through the same vocoder 18 used in the cell phone 14 for encoding voice signals 22. The IBS modem 28 enables voice signals 22 and digital data 29 to be transmitted over the same digital voice channel using the same cell phone circuitry. This prevents a user from having to transmit digital data using a separate wireless modem and enables a cell phone user to talk and send data during the same digital wireless call. The digital data 29 is modulated into an audio signal in the voice band. This prevents the cell phone vocoder 18 from filtering or excessively corrupting the binary values associated with the digital data 29. The same cell phone transceiver and encoding circuitry is used for transmitting and receiving both voice signals and digital data. This enables the IBS modem 28 to be much smaller, less complex and more energy efficient than a standalone wireless modem. In some embodiments, the IBS modem 28 is implemented entirely in software using only the existing hardware components in the cell phone 14.

One or more servers 40 are located at any of various locations in the wireless network 12, PSTN network 42, or IP network 46. Each server 40 includes one or more IBS modems 28 that encode, detect and decode the digital data 29 transmitted and received over the digital voice channel 34. Decoded digital audio tones 26 are either processed at the server 40 or routed to another computer, such as computer 50.

Figure 2:
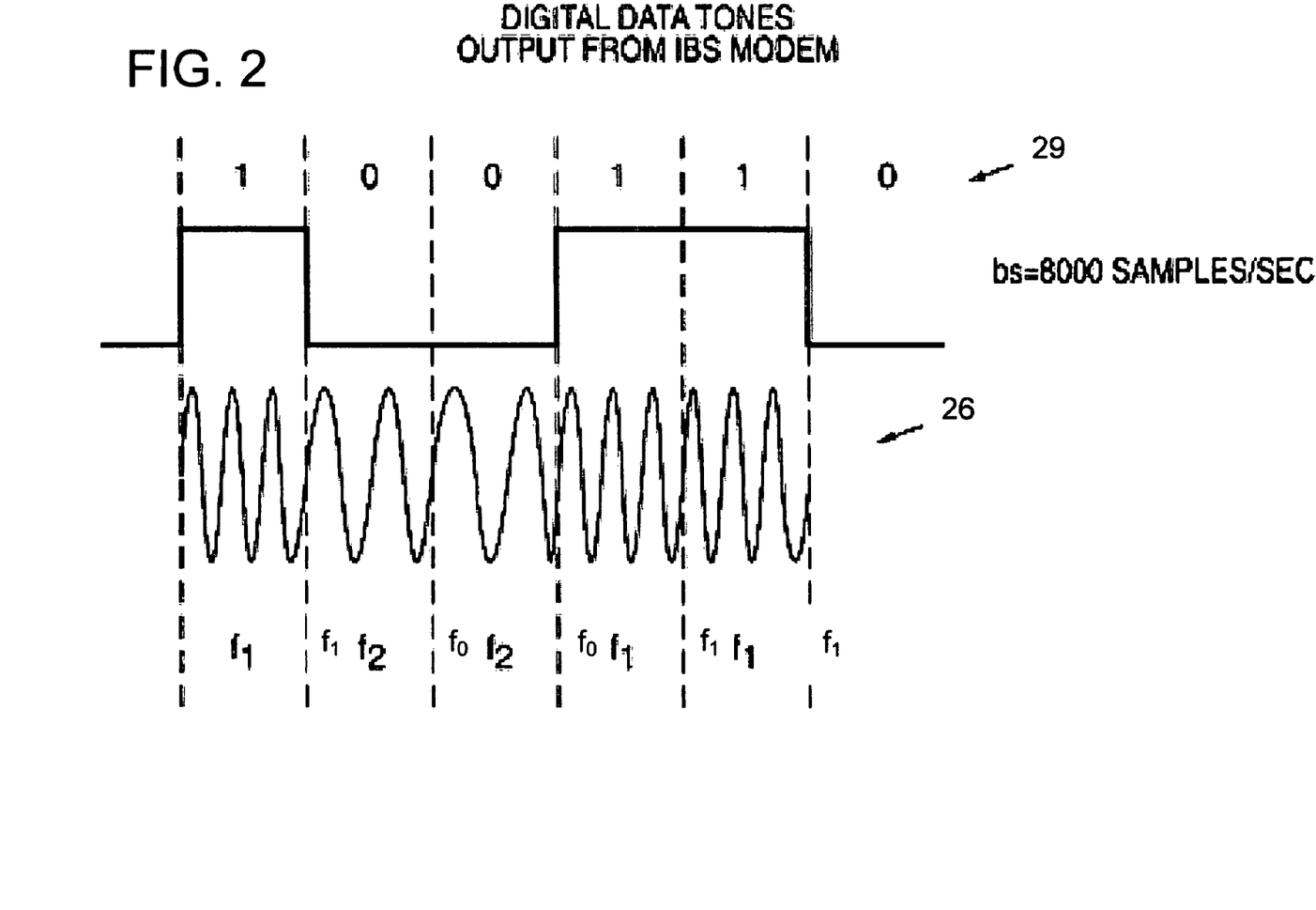
FIG. 2 is a schematic diagram of digital data tones output from an IBS modem.

FIG. 2 shows one exemplary embodiment of synthesized digital data tones 26 that are transmitted and received by an IBS modem 28. In the illustrated embodiment, the IBS modem 28 utilizes a binary frequency shift keying (FSK) modulation scheme, in which each bit of digital data 29 is converted into one of two different tones. In other embodiments, a variety of other suitable modulation schemes can be employed. For example, the IBS modem 28 could employ a 4-tone FSK scheme in which a different sinusoid frequency is assigned to each of the four possible quaternary values (represented by two-bit sequences: "00", "01", "10", and "11"). Alternatively, a binary phase shift keying (PSK) modulation scheme could be employed, in which a binary "0" is represented by one period of a sinusoid of a particular frequency with a phase of 0 degrees, and a binary "1" is represented by one period of a sinusoid of the same frequency but having a phase of 90 degrees.

Referring again to the binary FSK example shown in FIG. 2, a first tone is generated at an $f_1$ frequency and represents a binary "1" value, and a second tone is generated at an $f_0$ frequency and represents a binary "0" value. For each bit in the transmission sequence, the transmitter sends a sinusoid of frequency $f_1$ (for a "1") or $f_0$ (for a "0") over the duration of one bit interval. In some embodiments, the $f_1$ and $f_0$ frequencies fall within the range of about 200 Hertz (Hz) to about 3500 Hertz, which has been found to be an effective frequency range for generating the data tones 26 that represent the binary bit values. For example, in one embodiment, the $f_1$ frequency is about 500 Hertz, and the $f_0$ frequency is about 900 Hertz. In another embodiment, the $f_1$ frequency is about 2100 Hertz, and the $f_0$ frequency is about 2500 Hertz. The IBS modem 28 includes Sine and Cosine tables that are used to generate the digital values that represent the different amplitude and phase values for the $f_1$ and $f_0$ frequencies.

In some embodiments, the digital data is output on the digital voice channel 34 at a baud rate within the range of about 100 bits/second to about 500 bits/second, which has been found to be an effective range of baud rates for preventing corruption of the digital audio data by a wide variety of different cellular telephone voice coders. For example, in one embodiment, the digital data is output on the digital voice channel 34 at a baud rate of 400 bits/second. In this embodiment, the sine waves for each $f_1$ and $f_0$ tone begin and end at a zero amplitude point and continue for a duration of about 2.5 milliseconds. At a sample rate of 8000 samples per second, 20 samples are generated for each digital data tone 26.

Figure 3:
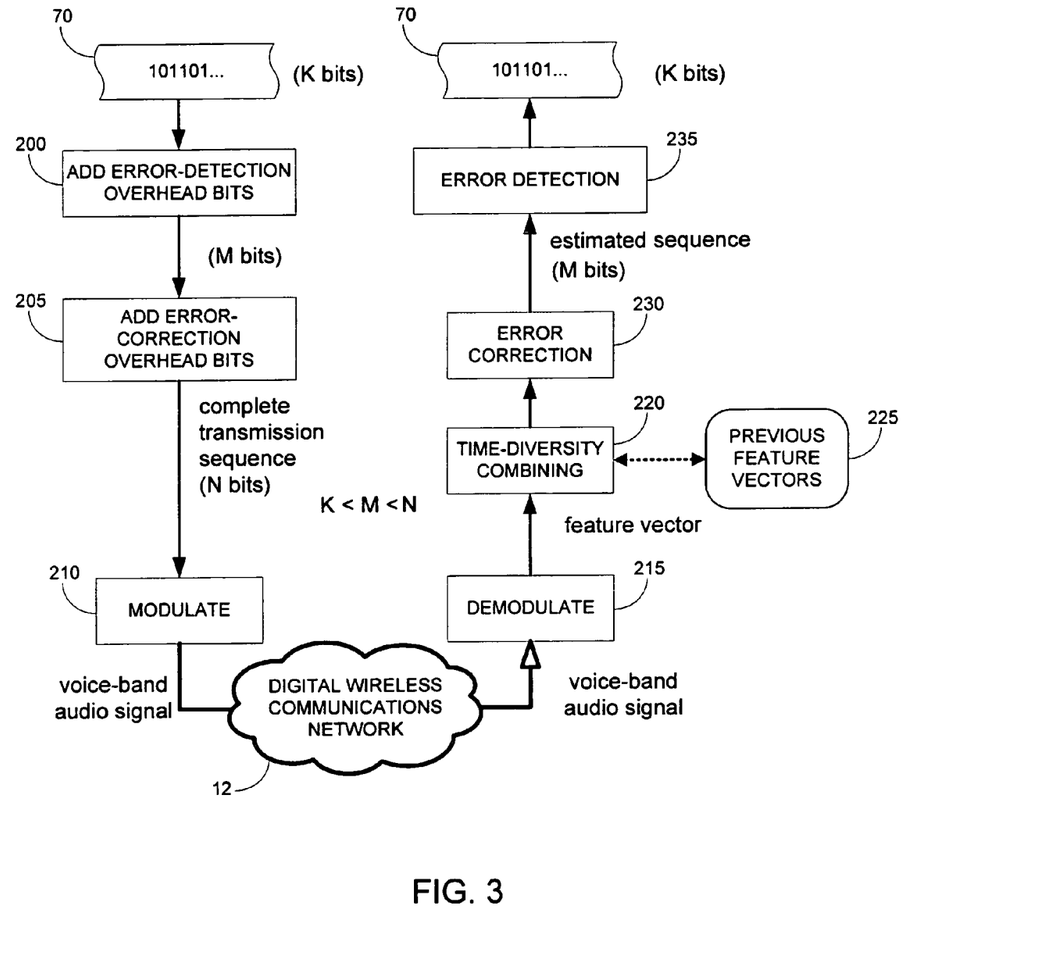
FIG. 3 illustrates a process for transmitting digital data over the wireless communications network.

FIG. 3 illustrates a process for transmitting a digital data packet 70 over the digital voice channel 34 of the wireless communications network 12, which implements time diversity combining in accordance with embodiments of the present application. In the illustrated embodiment, the digital data packet 70 comprises a sequence of K bits, which may represent a single packet or frame of a longer message payload. The message payload can be subdivided into packets of various sizes and formats using a wide variety of suitable techniques, such as, for example, those described in U.S. Pat. No. 6,690,681 entitled "In-Band Signaling For Data Communications Over Digital Wireless Telecommunications Network" and issued on Feb. 10, 2004, which is incorporated herein by reference. In some embodiments, each data packet 70 comprises about 100 data bits (i.e., K≈100), which may include a number of header bits, sync pattern bits, checksum bits, packet postamble bits, etc., depending on the selected packetization protocol.

Block 200 adds error-detection overhead bits, such as a cyclic redundancy check (CRC) code, to the digital data packet 70 to be transmitted. This creates a data sequence having M bits, where (M−K) represents the number of error-detection overhead bits. In some embodiments, block 200 adds about 16 error-detection overhead bits (i.e., M−K=16). Block 205 adds error-correction overhead bits to the M-bit data sequence, such as, for example, a Bose-Chaudhuri-Hocquenghem (BCH) code, Reed-Solomon code, or convolutional error correction code. This creates a complete transmission sequence having N bits, where (N−M) represents the number of error-correction overhead bits. In some embodiments, a complete transmission sequence includes a total of about 186 bits (i.e., N≈186) and about 70 error-correction overhead bits (i.e., N−M=70).

Block 210 modulates the N-bit data sequence into synthesized digital data tones 26 comprising a voice-band audio signal suitable for transmission over the digital voice channel 34 of the wireless telecommunications network 12, as described above. After transmission, block 215 demodulates the digital data tones 26 and generates a feature vector, which is used to create an estimate of the transmitted data sequence. As described in more detail below, if the feature vector contains errors, block 220 can perform time diversity combining of the feature vector with previous feature vectors 225 of the same N-bit data sequence (if any) that were transmitted earlier.

Block 230 performs error correction of the demodulated N-bit data sequence, and block 235 performs error detection of the resulting M-bit estimated data sequence. The error correction and error detection of the demodulated data signal can be carried out using a wide variety of suitable techniques that are well-known to those of ordinary skill in the art. If no errors are detected, then the K-bit digital data sequence is delivered to its intended recipient. Otherwise, the digital data packet 70 is retransmitted over the digital voice channel 34 of the wireless telecommunications network 12.

Figure 4A:
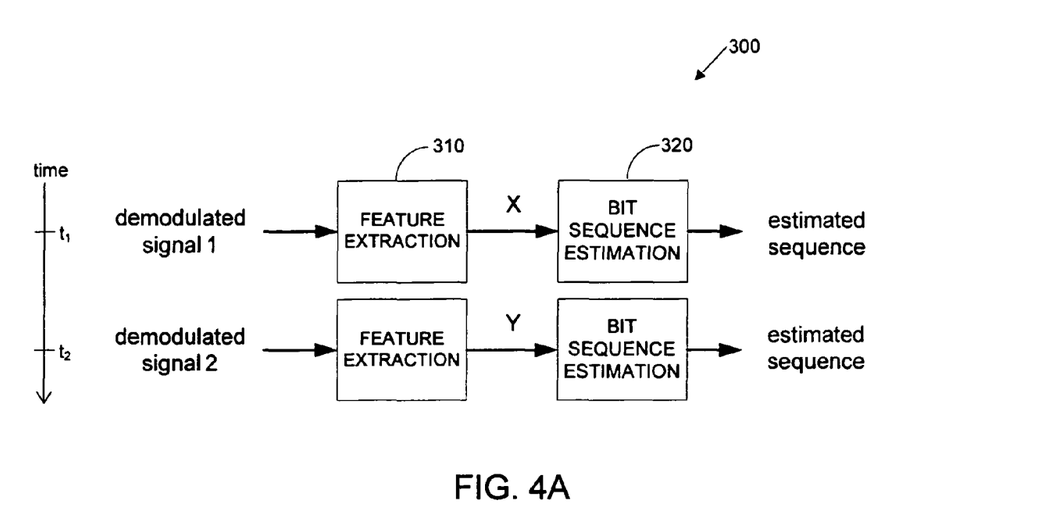
FIG. 4A is a diagram of a conventional receiver for receiving digital data transmitted over the wireless communications network.

FIG. 4A illustrates a conventional receiver 300 comprising a feature extraction module 310 and a bit sequence estimation module 320. As used herein, the term "module" may refer to any combination of software, firmware, or hardware used to perform the specified function or functions. It is contemplated that the functions performed by the modules described herein may be embodied within either a greater or lesser number of modules than is described in the accompanying text. For instance, a single function may be carried out through the operation of multiple modules, or more than one function may be performed by the same module. Additionally, the described modules may reside at a single location or at different locations connected through a wired or wireless telecommunications network.

As illustrated in FIG. 4A, at time $t_1$, a first demodulated signal is received by the feature extraction module 310. This demodulated signal comprises a sinusoidal waveform subdivided into a series of sequential bit intervals. The feature extraction module 310 processes the waveform in each bit interval independently and in sequence to generate a first feature vector X. Generally, a feature vector comprises a set of measurements performed on the demodulated signal for the purpose of estimating the transmitted bit sequence.

For example, in embodiments implementing a binary FSK modulation scheme, as shown in FIG. 2, the feature vector comprises a sequence of Fourier magnitudes. For each bit interval (e.g., 2.5 milliseconds at a baud rate of 400 bits/second), the feature extraction module 310 calculates a Fourier magnitude for each of the frequencies $f_1$ and $f_0$. These two magnitudes are denoted as $S(f_1)$ and $S(f_0)$, respectively. The quantity $S(f_1)-S(f_0)$ is then recorded as $X_i$, the "soft value" for the ith bit interval. The sequence of N soft values, $(X_1, X_2, X_3, \ldots, X_N)$ represents the feature vector of the N-bit data sequence.

In other embodiments, feature vectors may comprise a variety of other suitable measurements. For example, in embodiments implementing a binary PSK modulation scheme, the feature vector comprises a sequence of cross-correlation values. For each bit interval, the feature extraction module 310 calculates a cross-correlation value between the received waveform and each of two sinusoids: one with a phase of 0 degrees and one with a phase of 90 degrees. These two correlation values are denoted as $S_Q$ and $S_I$, respectively. The quantity $S_Q-S_I$ is then recorded as $X_i$, the "soft value" for the ith bit interval.

The feature vector X is submitted to the bit sequence estimation module 320, which analyzes the feature vector X and generates a corresponding estimated bit sequence. In the binary FSK example described above, the magnitude of $S(f_1)$ for each bit interval is proportional to the likelihood that the corresponding bit is a binary "1", and the magnitude of $S(f_0)$ is proportional to the likelihood that the corresponding bit is a binary "0". Therefore, if $X_i$, or $S(f_1)-S(f_0)$, is positive, then the bit sequence estimation module 320 designates the ith bit of the estimated bit sequence as a binary "1" value; otherwise the ith bit is designated as a binary "0" value.

The goal of the bit sequence estimation module 320 is to estimate the most probable sequence of bits represented by the feature vector X. In some embodiments, the bit sequence estimation module 320 applies a decision rule one bit at a time, as described above. In other embodiments, different bit sequence estimation techniques can be utilized. For example, when decoding a convolutional code, each individual bit decision is influenced by observations from neighboring bit periods.

In some cases, the estimated bit sequence generated by the bit sequence estimation module 320 includes errors, and the sequence fails the subsequent error detection check. In such cases, the conventional receiver 300 shown in FIG. 4A discards the first feature vector X, and waits for retransmission of the N-bit data sequence.

At time $t_2$, the feature extraction module 310 receives a second demodulated signal, which comprises a repeated transmission of the original N-bit data sequence. The feature extraction module 310 then generates a second feature vector Y. Because the conventional receiver 300 discarded the first feature vector X, the bit sequence estimation module 320 analyzes the second feature vector Y independently of the first feature vector X. If the second estimated bit sequence also has errors, the process will be repeated until an error-free copy of the N-bit data sequence can be received over the wireless network 12 or the transmission times out.

Figure 4B:
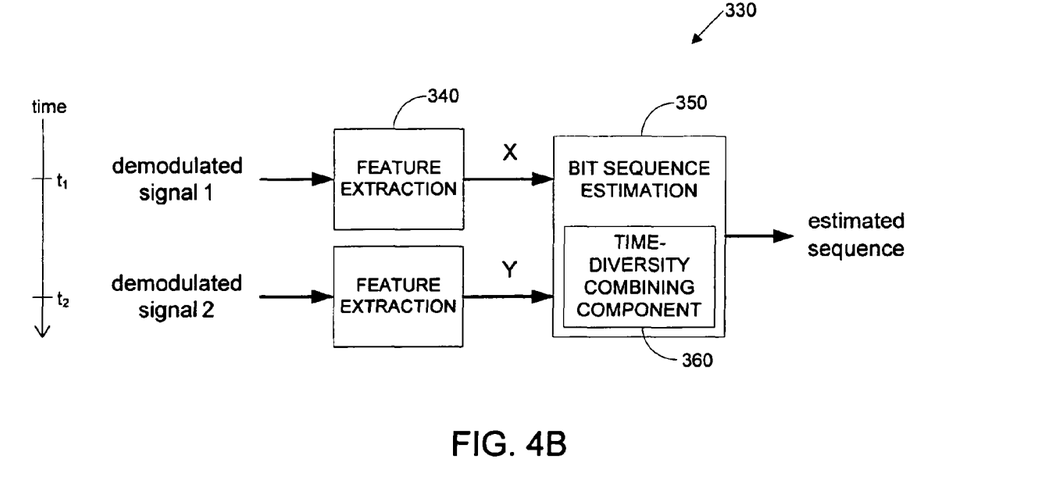
FIG. 4B is a diagram of a receiver with a time diversity combining component.

FIG. 4B illustrates a receiver 330 comprising a feature extraction module 340 and a bit sequence estimation module 350 including a time diversity combining component 360, in accordance with embodiments of the present application. In a manner similar to the conventional receiver 300, at time $t_1$, a first demodulated signal is received by the feature extraction module 340, which generates a first feature vector X representing the demodulated signal. The feature vector X is then submitted to the bit sequence estimation module 350, which analyzes the feature vector X and generates an estimated bit sequence, as described above. In the example shown in FIG. 4B, the estimated bit sequence includes errors. However, the receiver 330 does not discard the feature vector X. Rather, the receiver 330 stores the first feature vector X in memory for later use by the time diversity combining component 360.

At time $t_2$, the feature extraction module 310 receives a second demodulated signal, which comprises a repeated transmission of the original N-bit data sequence. The feature extraction module 310 then generates a second feature vector Y. If the estimated bit sequence based on the second feature vector Y contains errors, the time diversity combining component 360 can advantageously analyze the second feature vector Y in combination with the first feature vector X, which is stored in memory. Therefore, the bit sequence estimation module 350 can generate an additional estimated bit sequence based on the combination of the feature vectors X and Y.

In some embodiments, the feature vectors X and Y are summed or averaged together to generate the additional estimated bit sequence. For example, in the binary FSK example described above, if the feature vectors X and Y contain errors, the time diversity combining component 360 can generate a third feature vector, V, by adding the corresponding soft values together, as follows:

$V_1=X_1+Y_1, V_2=X_2+Y_2, \ldots, V_N=X_N+Y_N$.

The bit sequence estimation module 350 can then create the estimated bit sequence by applying the same bit sequence estimation described above: if $V_i$ is positive, then the ith bit is designated as a binary "1" value, otherwise the ith bit is designated as a binary "0" value.

For any constant bit error rate, the combined vector V will have a higher probability of producing a correct sequence estimate than either X or Y by itself. The combined vector V is typically more accurate than X or Y alone because when two separate copies of a given signal are transmitted over a low-quality channel, they will likely experience distortion effects in different ways. Therefore, when taken together, their associated feature vectors X and Y typically produce a better estimate of the transmitted sequence than either one could by itself.

If the combined vector V does not produce a correct estimated bit sequence, the first and second feature vectors X and Y remain stored in memory. If the next received feature vector Z (not shown) also fails, then the time diversity combining component 360 can construct another new combined vector, W, by summing soft values from all three received vectors, as follows:

$W_1=X_1+Y_1+Z_1, W_2=X_2+Y_2+Z_2, \ldots, W_N=X_N+Y_N+Z_N.$

Alternatively, since there is an odd number of feature vectors, the ith bit value could be assigned by a majority vote among $X_i$, $Y_i$, and $Z_i$. The combined vector W has an even higher probability of producing a successful estimate than the vector V. Thus, by taking advantage of the time diversity of repeated transmissions, the receiver 330 can make better and better estimates of the transmitted data sequence with each repeated transmission.

Figure 5:
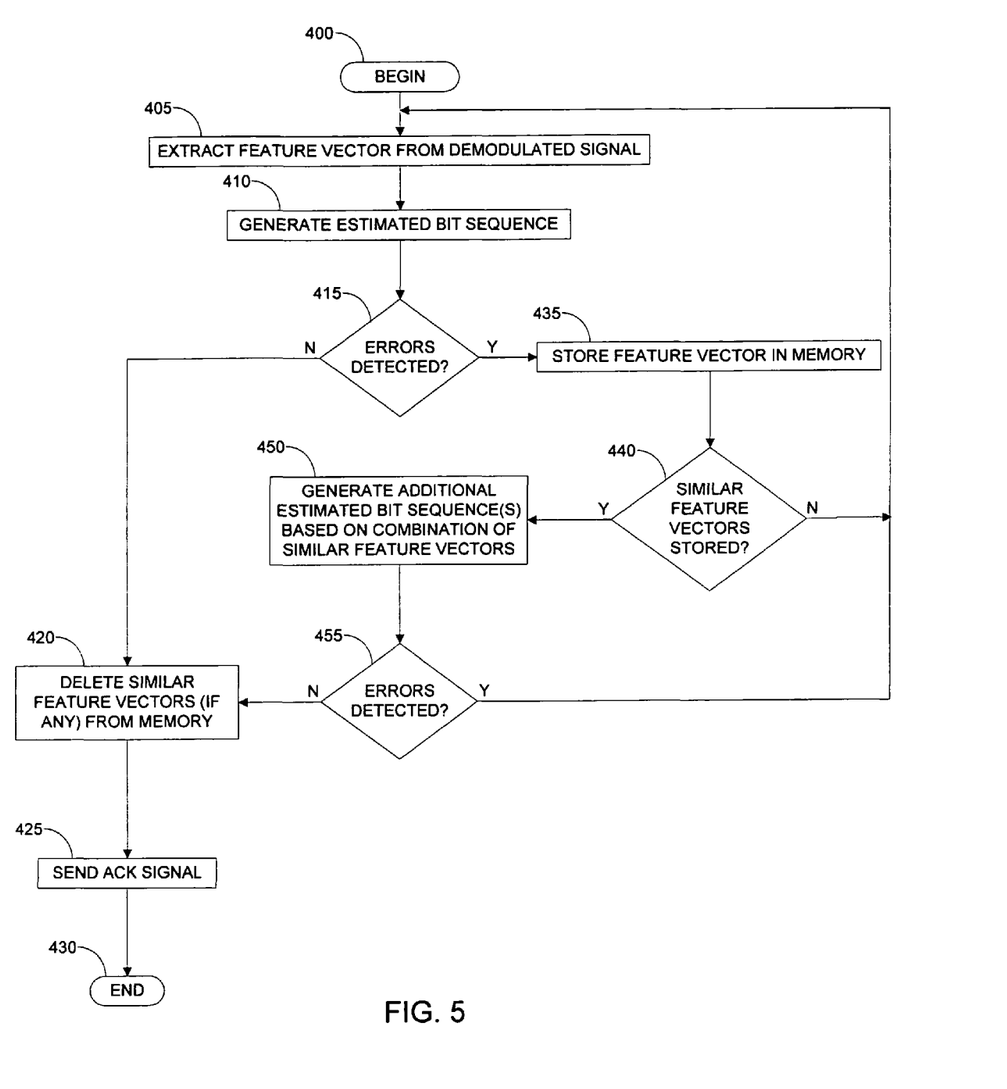
FIG. 5 is a flow diagram demonstrating the operation of the receiver shown in FIG. 4B.

FIG. 5 illustrates the operation of the receiver 330 having time diversity combining capability. Block 400 represents the beginning of the process when a given data signal has been received and demodulated by an IBS modem 28. At this point in the process, the IBS modem 28 has detected the data signal and performed synchronization and other steps necessary to demodulate the signal. As described above, the data signal may comprise virtually any desired string of bits, such as, for example, a data packet representing a portion of a message payload.

Block 405 extracts a feature vector from the demodulated data signal. Block 410 generates an estimated bit sequence based on the extracted feature vector. In some embodiments, this estimation involves an error correction component, such as, for example, a BCH code, Reed-Solomon code, or convolutional error correction code. Decision block 415 determines whether the estimated bit sequence includes any errors. In some embodiments, this determination includes a CRC error-checking algorithm.

If no errors are detected, then block 420 deletes similar feature vectors (if any) stored in the memory of the receiver 330. Generally, two or more feature vectors are considered "similar" if they correspond to a single data sequence. In some embodiments, feature vectors corresponding to different data sequences may be stored in the memory of the receiver 330 at the same time. In these embodiments, similar feature vectors can be identified by determining whether the percentage of common bits between two given vectors exceeds a selected threshold, such as, for example, 80%. Once the similar feature vectors are identified and deleted, block 425 sends an acknowledge (ACK) signal to the transmitter, and the process ends at block 430.

If errors are detected at decision block 415, then block 435 stores the current feature vector in the memory of the receiver 330. Optional decision block 440 determines whether any similar feature vectors are stored in memory. As described above, this determination can be made by evaluating whether any of the feature vectors stored in memory have the desired threshold percentage of bits in common with the feature vector of interest. If not, the digital data signal is retransmitted and control returns back to block 405, where the feature vector is extracted from the retransmitted data signal.

In the illustrated embodiment, if decision block 440 determines that similar feature vectors are stored in memory, then block 450 generates one or more additional estimated bit sequences based on the combination of the similar feature vectors, as described above. In other embodiments, block 450 generates additional estimated bit sequences by combining all of the feature vectors stored in memory, regardless of whether they are similar. Decision block 455 determines whether the additional estimated bit sequence(s) includes any errors. If not, then block 420 deletes the similar feature vectors stored in memory, and the method proceeds as described above.

If errors are detected at decision block 455, then the digital data signal is retransmitted and control returns back to block 405, as described above. In some cases, the transmitter may terminate the process before an error-free copy of the digital data signal is received. For example, the transmitter may stop retransmitting the digital data signal after a selected number of unsuccessful repeated transmissions or a selected period of time since the first unsuccessful transmission.

The time diversity combining systems and methods described above present a number of distinct advantages over conventional approaches. For example, by storing feature vectors in memory, the receiver 330 with the time diversity combining component 360 can extract more information from unsuccessful transmissions than a conventional receiver 300. Therefore, the receiver 330 can often produce an error-free information sequence using fewer repeated transmissions than a conventional receiver 300. Alternatively, a more efficient FEC scheme can be implemented, with fewer overhead bits for error correction than are required by conventional systems.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An apparatus, comprising:
   transceiver circuitry configured to establish a voice session connection over a digital voice channel of a wireless telecommunications network, to demodulate received synthesized digital data tones transmitted over the digital voice channel into a demodulated signal;
   a feature vector extraction module configured to perform a set of measurements on the demodulated signal and generate a first feature vector that comprises the set of measurements; and
   a bit sequence estimation module configured to analyze the first feature vector and generate a first estimated bit sequence based on the first feature vector;
   wherein the bit sequence estimation module comprises a time diversity combining component configured to:
   determine whether the generated first estimated bit sequence is a satisfactory representation of a segment of an original bit sequence based on preset criteria, and if the generated first estimated bit sequence is not a satisfactory representation of the segment based on the preset criteria, identify a stored second feature vector that represents the same segment of the original bit sequence and which also generates an unsatisfactory representation of the segment based on the preset criteria, wherein the stored second feature vector comprises a set of measurements of a previously demodulated signal;
   sum or average an Nth sub-value of the first feature vector with an Nth sub-value of the second feature vector;
   generate a third feature vector by analyzing the first feature vector in combination with the identified second stored feature vector, wherein the third feature vector has an Nth sub-value equal to the sum or average;

generate a second estimated bit sequence based on the third feature vector; and check for errors in the second estimated bit sequence.

2. The apparatus of claim 1, wherein each feature vector comprises a sequence of Fourier magnitudes or a sequence of cross-correlation values.

3. The apparatus of claim 1, further comprising an error detection module configured to check for errors within the first and second estimated bit sequences.

4. The apparatus of claim 1, wherein the bit sequence estimation module comprises an error correction component configured to implement a selected forward error correction method.

5. The apparatus of claim 4, wherein the selected forward error correction method comprises BCH, Reed-Solomon, or convolutional error correction.

6. The apparatus of claim 1, further comprising an error detection module configured to implement a CRC error checking algorithm.

7. The apparatus of claim 1, wherein each feature vector contains a plurality of soft values, and wherein an Nth soft value of the first feature vector is signed oppositely from an Nth soft value of the second feature vector, and wherein the feature vector extraction module is configured to:

sum the oppositely signed soft values; and calculate a corresponding bit of the second estimated bit sequence according to the sum.

8. The apparatus of claim 1, wherein the synthesized digital data tones received over the digital voice channel are a retransmission of previously received synthesized data tones corresponding to the second stored feature vector.

9. The apparatus of claim 1, wherein said error checking indicates that the second estimated bit sequence is a satisfactory representation of the segment of the original bit sequence based on the preset criteria, and wherein the second estimated bit sequence is based on the feature vectors that each generate unsatisfactory representations of the segment of the original bit sequence based on the preset criteria.

10. The apparatus of claim 1, wherein the time diversity combining component is further configured to:

select an additional stored feature vector for combination with the first and second feature vectors;

sum or average the Nth sub-value of the first feature vector, the Nth sub-value of the second feature vector, and an Nth sub-value of the additional feature vector;

generate an additional estimated bit sequence based on a combination of the first feature vector, the second feature vector, and the additional feature vector; and check for errors within the additional estimated bit sequence.

11. A method, comprising:

establishing a voice session connection over a digital voice channel of a wireless telecommunications network;

receiving synthesized digital data tones transmitted over the digital voice channel and demodulating the synthesized digital data tones into a demodulated signal;

performing a set of measurements on the demodulated signal and generating a first feature vector that comprises the set of measurements;

generating a first estimated bit sequence based on the first feature vector;

determining whether the first estimated bit sequence meets a threshold accuracy for estimating a segment of an original bit sequence represented by the synthesized digital data tones;

if the first estimated bit sequence does not meet the threshold accuracy, selecting a second feature vector stored in a memory module, wherein the second feature vector comprises a set of measurements of a previously demodulated signal, and wherein the second feature vector represents the same segment of the original bit sequence as the first feature vector and generates a second different bit sequence which also does not meet the threshold accuracy for estimating the original bit sequence;

summing or averaging an Nth sub-value of the first feature vector with an Nth sub-value of the second feature vector;

generating a third feature vector based on information from the first feature vector and the second feature vector, wherein the third feature vector has an Nth sub-value equal to the sum or average;

generating a third estimated bit sequence based on the third feature vector; and checking for errors within the third estimated bit sequence.

12. The method according to claim 11, further comprising:

selecting an additional feature vector stored in the memory module for combination with the first and second feature vectors;

generating an additional estimated bit sequence based on a combination of the first feature vector, the second feature vector, and the additional feature vector; and checking for errors within the additional estimated bit sequence.

13. The method according to claim 11, wherein selecting the second feature vector comprises determining whether the second feature vector represents the same segment of the original bit sequence as the first feature vector.

14. The method according to claim 11, further comprising deleting the second feature vector from the memory module if the third estimated bit sequence meets the threshold accuracy for estimating the original bit sequence.

15. The method according to claim 11, wherein the synthesized digital data tones are transmitted using an FSK modulation scheme or a PSK modulation scheme.

16. The method according to claim 11, wherein the sub-values in each feature vector comprise a sequence of Fourier magnitudes or a sequence of cross-correlation values.

17. The method according to claim 11, wherein the synthesized digital data tones have frequencies within the range of about 200 Hertz to about 3500 Hertz.

18. The method according to claim 11, wherein the synthesized digital data tones are transmitted at a baud rate within the range of about 100 bits/second to about 500 bits/second.

19. The method of claim 11, wherein the first feature vector represents only data represented by the second feature vector, and wherein the third estimated bit sequence represents only data represented by the first and second estimated bit sequences.

20. A machine readable medium comprising machine readable instructions for causing a device to perform a method comprising:

establishing a voice session connection over a digital voice channel of a wireless telecommunications network;

receiving synthesized digital data tones transmitted over the digital voice channel and demodulating the synthesized digital data tones into a demodulated signal;

performing a set of measurements on the demodulated signal and generating a first feature vector that comprises the set of measurements;

generating a first estimated bit sequence based on the first feature vector;

determining whether the first estimated bit sequence meets a threshold accuracy for estimating a segment of an original bit sequence represented by the synthesized digital data tones;

if the first estimated bit sequence does not meet the threshold accuracy, selecting a second feature vector stored in a memory module, wherein the second feature vector comprises a previously demodulated signal, and wherein the second feature vector represents the same segment as the first feature vector and generates a second different bit sequence which also does not meet the threshold accuracy for estimating the original bit sequence;

summing or averaging an Nth sub-value of the first feature vector with an Nth sub-value of the second feature vector;

generating a third feature vector based on information from the first feature vector and the second feature vector, wherein the third feature vector has an Nth sub-value equal to the sum or average;

generating a third estimated bit sequence based on the third feature vector; and checking for errors within the third estimated bit sequence.

21. The machine readable medium according to claim 20, wherein the method further comprises:

selecting an additional feature vector stored in the memory module for combination with the first and second feature vectors;

generating an additional estimated bit sequence based on a combination of the first feature vector, the second feature vector, and the additional feature vector; and checking for errors within the additional estimated bit sequence.

22. The machine readable medium according to claim 20, wherein selecting the second feature vector comprises determining whether the second feature vector represents the same segment of the original bit sequence as the first feature vector.

23. A method, comprising:

establishing a voice session connection over a digital voice channel of a wireless telecommunications network;

receiving synthesized digital data tones transmitted over the digital voice channel and demodulating the synthesized digital data tones into a demodulated signal;

performing a set of measurements on the demodulated signal and generating a first feature vector that comprises the set of measurements;

generating a first estimated bit sequence based on the first feature vector;

determining whether the first estimated bit sequence meets a threshold accuracy for estimating a segment of an original bit sequence represented by the synthesized digital data tones;

if the first estimated bit sequence does not meet the threshold accuracy, selecting a second feature vector stored in a memory module, wherein the second feature vector comprises a previously demodulated signal, and wherein the second feature vector represents the same segment of the original bit sequence as the first feature vector and generates a second different bit sequence which also does not meet the threshold accuracy for estimating the original bit sequence;

summing or averaging an Nth sub-value of the first feature vector with an Nth sub-value of the second feature vector;

generating a third feature vector based on the first and second feature vectors, wherein the third feature vector has an Nth sub-value equal to the sum or average;

generating a third estimated bit sequence using the third feature vector; and checking for errors within the third estimated bit sequence.

24. The method of claim 23, wherein the Nth sub-values are soft values or cross-correlation values.

25. The method of claim 23, wherein the Nth sub-values have different magnitudes.

26. The method of claim 23, wherein the Nth sub-values have the same magnitudes.

* * * * *